United States Patent [19]

Oldendorph

[11] 4,223,959
[45] Sep. 23, 1980

[54] TEMPERATURE COMPENSATING BEARING SUPPORT

[75] Inventor: Oliver F. Oldendorph, Coronado, Calif.

[73] Assignee: General Dynamics, San Diego, Calif.

[21] Appl. No.: 26,959

[22] Filed: Apr. 4, 1979

[51] Int. Cl.³ .............................................. F16C 35/04
[52] U.S. Cl. .............................. 308/15; 308/DIG. 14
[58] Field of Search .................. 308/15, DIG. 14, 27, 308/22, DIG. 15, 188, 189 R

[56] References Cited

U.S. PATENT DOCUMENTS

| | | | |
|---|---|---|---|
| 3,266,006 | 8/1966 | Abbott | 308/DIG. 14 |
| 3,526,394 | 9/1970 | Howell | 308/27 |
| 4,065,190 | 12/1977 | Hallerback | 308/15 |
| 4,149,759 | 4/1979 | Miller | 308/15 |

*Primary Examiner*—Lenard A. Footland
*Attorney, Agent, or Firm*—John R. Duncan; Frank D. Gilliam

[57] ABSTRACT

A bearing assembly including anti-friction bearings and bearing mounts between rotatable structures of low coefficient of expansion material, by which the expansion and contraction of the metallic bearings, due to temperature swings, is allowed without radial constraint or without a loosening of the bearings from the structures while maintaining the bearings and the structures in alignment. This is accomplished by providing a loose connection and a plurality of tangentially oriented linkages connected between the structures and the bearings. The loose connection allows the bearings to expand or contract in a radial direction independently of the structures and the links allow radial displacement without a translation circumferentially of the assembly with respect to the structures.

5 Claims, 5 Drawing Figures

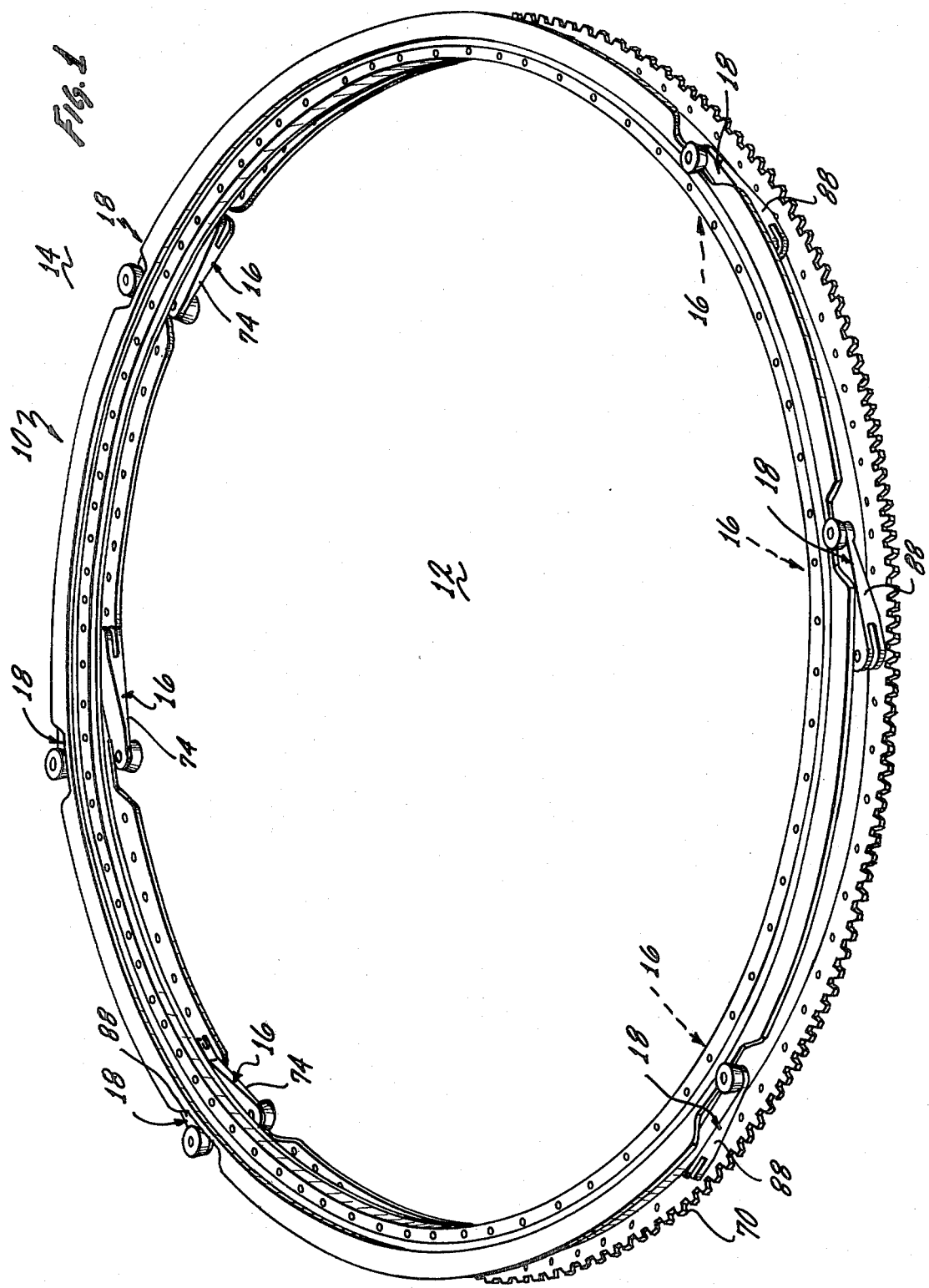

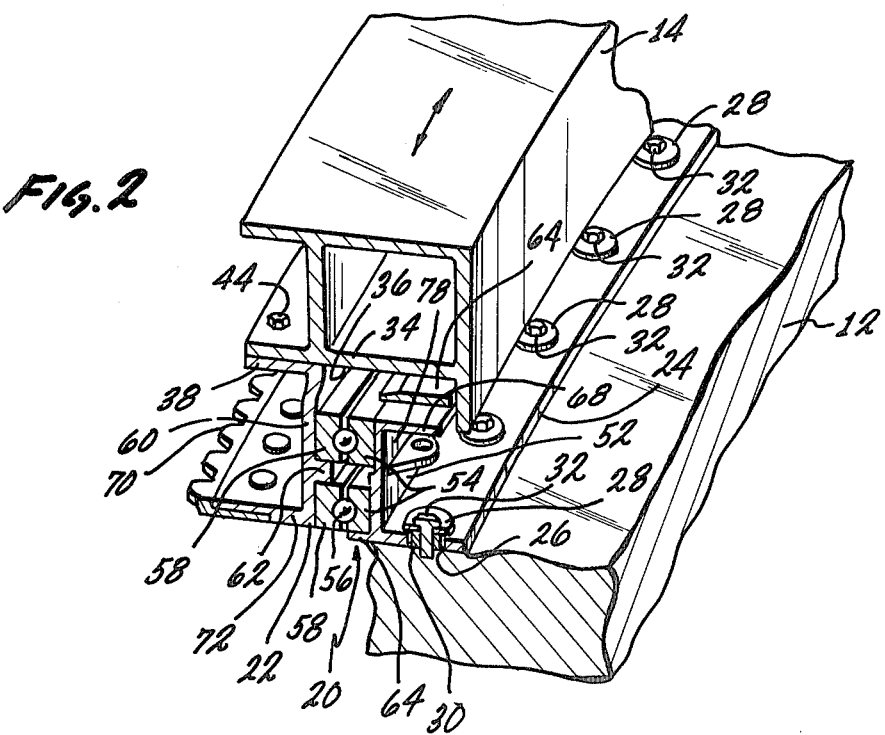
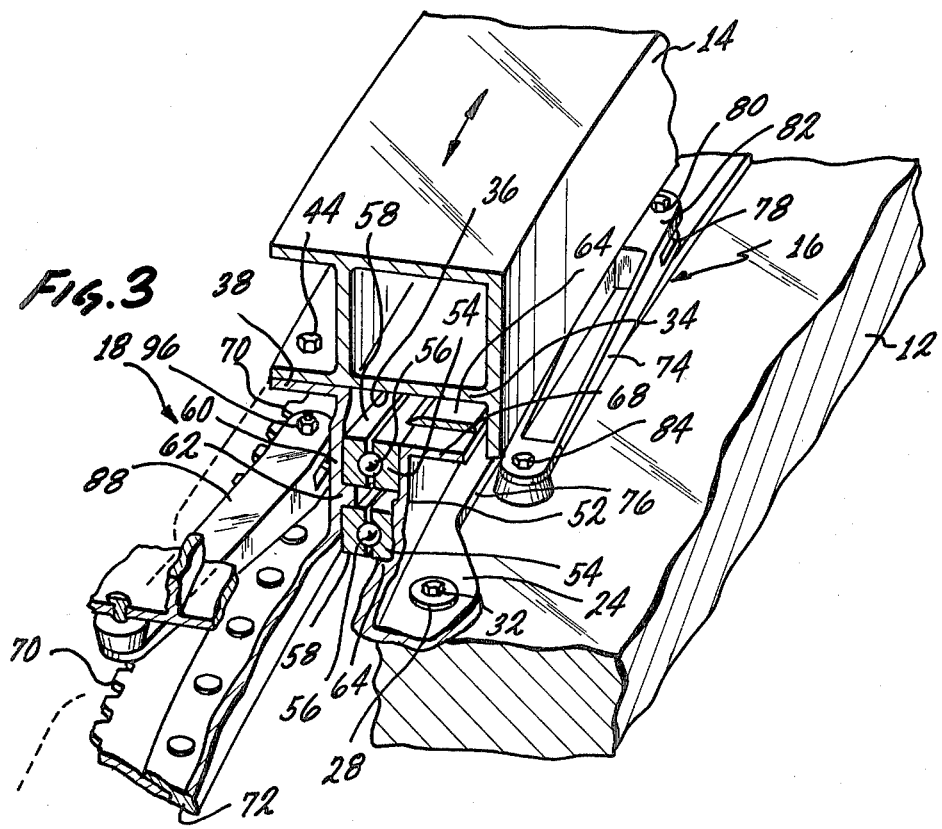

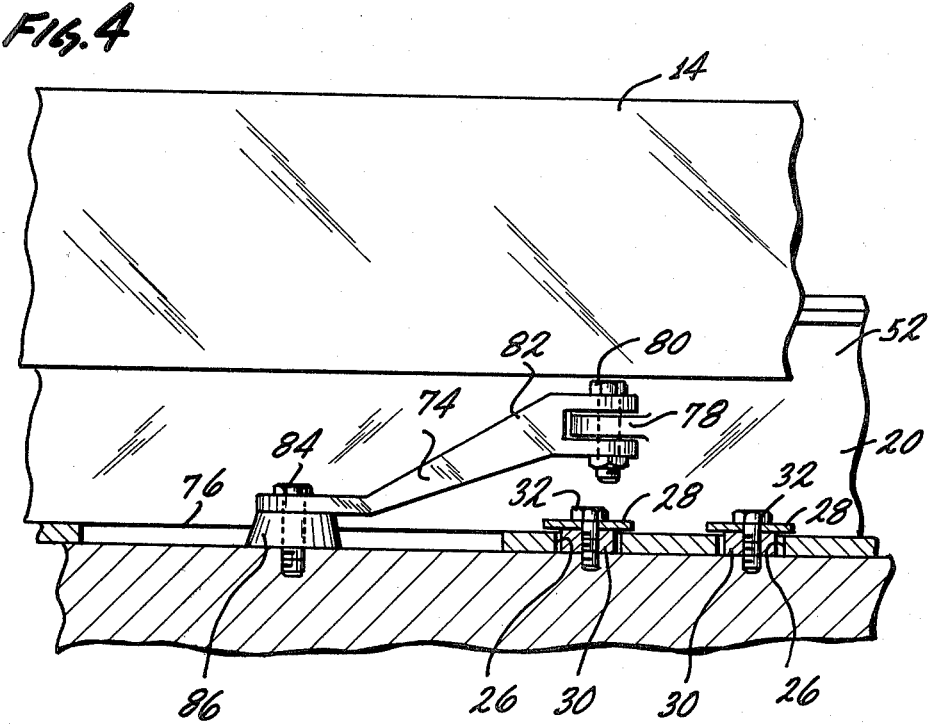
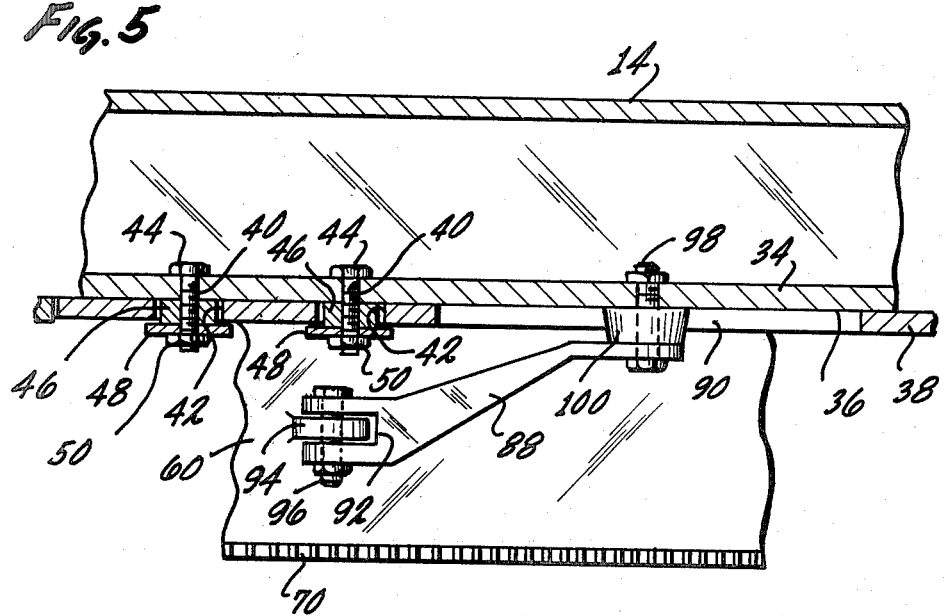

TEMPERATURE COMPENSATING BEARING SUPPORT

BACKGROUND OF THE INVENTION

This invention relates to bearings and bearing mountings disposed between two relatively rotatable structures and in particular to the mounting of metal bearings between rotatable structures of material having a low coefficient of expansion, such as graphite/epoxy.

Antifriction bearing are often mounted by pressing the outer race into a bored housing with a slight interference fit, or by pressing the inner race onto a shaft, again with a slight interference fit. When metal bearings are used with metal housings or metal shafts, this procedure is satisfactory because metals usually have similar coefficients or expansion.

Some materials, however, have no significant coefficient or expansion—graphite/epoxy is one such material. Using such a material with a metallic bearing introduces a problem of differential thermal expansion (or contraction) between the bearing and the housing (the element into which the outer race is pressed) and between the bearing and the "shaft" (the element onto which the inner race is pressed). As an example of such a problem, a metal bearing race expanding due to temperature increase inside of a graphite/epoxy housing, which does not expand, may rupture the housing. If the temperature is lowered, below that which existed when the bearing was pressed into the housing, the bearing race will contract while the housing will not. The bearing race, in this instance, may become so much smaller that it will be only a loose fit (instead of a press fit) in the housing, and may, in fact, fall out of the housing.

The amount of thermal expansion, or contraction, of the metal bearing depends upon the coefficient or thermal expansion of the metallic material and upon the product of the diameter of the bearing in inches and the change in temperature of the bearing, usually measured in degrees fahrenheit. Thus, a large diameter bearing may suffer an unacceptable change in diameter when subjected to a small temperature change; a small diameter bearing may suffer an equally unacceptable diameter change if the change in temperature is sufficiently great. Each bearing application will experience unacceptable dimension or change at a certain predictable combination of bearing diameter and temperature change.

Thus, there is a need for a bearing assembly by which radial motion of the expanding and contracting bearings is allowed without radial constraint or loosening yet the axis of the bearings and the axis of the graphite/epoxy rotatable structures, in which the bearing assemblies are mounted, are maintained in alignment.

Accordingly, it is a principle object of this invention to provide bearings in relatively rotatable structures, of low coefficient of expansion material, which will maintain alignment during temperature changes.

Still another object of this invention is to provide a means for mounting steel bearings in rotating structures of low coefficient of expansion material, such as graphite/epoxy, which allows radial expansion and contraction without constraint or loosening and maintains the alignment of the axis of the bearing with the axes of the rotating elements.

SUMMARY OF THE INVENTION

The invention which fulfills the foregoing objects comprises a bearing assembly having inboard and outboard bearing supporting rings loosely connected to structures of low coefficient of expansion and a series of linkages placed tangentially to the bearing supporting rings and connected to each ring and to its adjacent supporting structure. As the supporting rings and bearings expand, the linkages pivot and allow radial displacement of the rings with respect to the structures, while at the same time, translation of the ring in the plane of the ring is prevented by the restraint offered by the linkages. On the other hand, motion in either axial direction relative to the structures is restrained by the means which provides the loose connection which hold the supporting rings to the structure.

BRIEF DESCRIPTION OF THE DRAWINGS

FIG. 1 is a perspective view of the entire bearing assembly mounted in graphite/epoxy structures;

FIG. 2 is a perspective view of a portion of the bearing assembly, shown in FIG. 1, enlarged to show the loose connections between the supporting rings and the graphite/epoxy structures;

FIG. 3 is another perspective view illustrating the linkage means for both the inboard and outboard supporting rings and the means for connecting the rings to the structures;

FIG. 4 is a cross-sectional side view showing the linkage means connected to the inboard structure; and FIG. 5 is a cross-sectional view showing the linkage means connected to the outboard structure.

BRIEF DESCRIPTION OF THE PREFERRED EMBODIMENT

Turning first to FIG. 1, the bearing assembly, 10 comprising anti-friction bearings and bearing mounting means, is shown connected to an inboard structure 12 of low coefficient of expansion material and to second outboard structure 14 also of low coefficient of expansion material; the material of both structures being graphite/epoxy, for example. The structures 12 and 14 are shown, more or less, in the plane of the drawing and also included in this view are an equal number of inboard and outboard linkages 16 and 18, respectively, (6 outboard linkages being shown), spaced about the circumference and forming part of the bearing assembly. These linkages will be described in more detail hereinafter.

Taking FIGS. 2 and 3 together, it can be seen that FIG. 2 is an enlarged detailed cross-sectional view of a portion of the bearing assembly shown in FIG. 1 in an area between the linkages, while FIG. 3 is an enlarged detailed cross-sectional view portion of the bearing assembly of FIG. 1 in the area of the linkages.

Turning first now to FIG. 2, it can be seen that the inboard structure 12 is loosely connected to a first inboard bearing supporting ring 20 while a second or outboard bearing supporting ring 22 is shown loosely connected to the outboard structure 14.

The inboard ring 20 is U-shaped in cross-section with an inner flange 24 directly contacting the inboard structure 12 and having a plurality of apertures 26 spaced about periphery of the ring to provide the loose connection to the inboard structure 12 (see also FIG. 4). Each aperture 26 is provided with a clamp washer 28 which is larger than the aperture and a spacer 30 which is smaller than the aperture but slightly longer than the thickness of the flange 24. The washer and spacer which together with a bolt 32 tightly threaded into the inboard structure 12 provide the loose connection which allows movement (radial expansion and contraction due to thermalswings) of the inboard ring 20 relative to and independently of the inboard structure 12.

The outboard structure 14 is formed as a channel member having an inner ledge 34 which defines a bore 36 between the two structures 12 and 14 for relative rotation therebetween. The outboard supporting ring 22, like the inboard supporting ring 20, is U-shaped in cross-section and is also loosely connected to the outboard structure 14 by an arrangement identical to the arrangement loosely connecting the inboard ring 20 to the inboard structure 12, (see also FIG. 5). Thus, both the inner ledge 34 of the outboard structure and the outer flange 38 of the outboard ring 22 are provided with the plurality of aligned apertures 40 and 42. Each aperture 42 in the flange 38 is larger in diameter than its aligned aperture 40 in the ledge 34 so that a bolt 44 fits tightly in the ledge 34 while the aperture in the flange is oversize to accomodate a spacer 46 which is smaller in diameter than the apertures 42. The spacer 46 is also slightly longer than the thickness of flange 38.

Each bolt 44 is secured to the flange by a clamp washer 48 and a nut 50; shown in FIG. 5, and thus the oversize aperture in the flange permits a movement of the supporting ring 22 relative to the outboard structure 14. This movement is a radial expansion and contraction of the outboard ring due to thermal swings.

To complete the description of FIG. 2, the web portion 52 between the flanges of the inboard supporting ring 20 is provided with a pair of inner races 54 to support ball bearings 56 while the outer races 58, also supporting bearings 56, are mounted on the web 60 of the outboard supporting ring 22 to form pairs of ball bearings spaced from each other by an inwardly directed rim 62.

The outer races 58 are pressed into the outboard ring 22 against opposite sides of inwardly projecting rim 62 which positions them. These inner races 54 are held in position on inboard ring 20 by being clamped between lip 64 at the bottom of ring 20 and a positioning/retaining ring 66.

The ledge 34 of the outboard structure 14 spans the two supporting rings and the bearings and terminates below the outer flange 68 of the inboard supporting ring. Finally, the retaining/positioning ring 66 is shown secured to the outer flange 68 of the inboard supporting ring and prevents bearing race 54 from being withdrawn from inboard ring 20.

On the other side, a ring gear 70 is permanently secured to the flange 72 of the outboard supporting ring 22 to provide a driving relationship with the outboard structure 14 relative to the inboard structure 12.

Turning now specifically to FIGS. 3-5, the linkages 16 and 18 mentioned in connection with FIG. 1 are shown in more detail in these Figures. Taking first the inboard linkage 16 shown in FIGS. 3 and 4 and describing one linkage only, to accomodate the link 74 itself, the inner flange 24 of the inboard ring is provided with a clearance or a cutaway portion 76 which permits the link to be in tangential alignment with the ring. Also, the inboard ring is provided with an apertured ear or lug 78 which extends in a direction parallel to the flange 24 and midway there between. This apertured lug is pivotally connected by a hinge pin in the form of bolt 80 and nut 80 to the apertured bifurcated end 82 of the link 74, while the other end of link 74 is offset toward the flange 24 and is also apertured to receive a bolt 84 to directly connect the link to the inboard structure 12 through a spacer 86.

Similarly, taking FIGS. 3 and 5 together, the linkage 18 for the outboard structure 14 is shown as comprising link 88 located in a cut-away portion 90 in the flange 38 of the outboard support ring 22.

Like the showing of FIGS. 3 and 4 above, only one link will be described although it is understood there are 6 such links situated about the outer ring.

Link 88 has one end apertured and bifurcated a at 92 to encompass a lug or ear 94 on the web 60. The ear or lug 94 is also apertured to receive a hinge pin 96 in the form of a nut and bolt for a hinged connection of the link to the outboard ring. The other end of the link 88 is offset towards the flange 38 and is apertured to receive a bolt 98 which attaches the link to the outboard structure 14 through a spacer 100.

Again, all of the linkages are located so that their major axes are tangential to the respective inboard and outboard rings.

From the foregoing, it can be seen that the metal inboard and outboard rings 20 and 22 are able to expand or contract in response to a temperature swing in a radial direction independently of structures 12 and 14 by reason of the oversized apertures 26 and 42 cooperating with their respective spacers 30 and 46 for loosely connecting the rings to the structures. Also, with the tangentially placed links located about the rings, as the inboard and outboard rings expand, the links pivot and allow radial displacement of the rings with respect to the structures 12 and 14. Thus, translation of each ring, in the plane of the ring, with respect to its structure, is prevented by the restraint of the links. On the other hand, motion of the rings away from the low expansion material, in the direction perpendicular to the plane of the ring, is restrained by the bolt and clamp connection which hold the rings to their respective structures.

It is to be understood that the anti-friction bearings themselves with suitable lugs and oversize holes incorporated in the bearing races could be bolted directly to the structures in the same manner as the inboard and outboard rings but without the use of such rings.

What is claimed is:

1. A bearing assembly including bearing means and mounting means having a relatively high coefficient of expansion for connecting rotatable structures of low coefficient of expansion material, comprising;

means for loosely connecting said bearing assembly to each of said rotatable structures so that expansion and contraction of said bearing assembly due to temperature variations is independent of its connected structures; and means pivotly connecting said bearing assembly to each of said rotatable structures to restrain axial translation of the bearing assembly in the plane of the bearing assembly yet permit radial movement thereof due to temperature variations.

2. A bearing assembly as claimed in claim 1 including inboard and outboard bearing support rings;

each bearing support ring having a flange in direct contact with each of said rotatable structures, said flange having a plurality of apertures therein; and fastening means connecting said flange to its respective structure said apertures being oversize with respect to said fastening means for allowing movement therebetween.

3. The bearing assembly as claimed in claim 2 wherein fastening means comprises spacer means, said spacer means being smaller in diameter than the diameter of said apertures.

4. The bearing assembly as claimed in claim 3 wherein said means pivotally connecting said bearing assembly to each of said structures comprises linkage means, said linkage means being connected to said supporting rings and to said structure.

5. The bearing assembly as claimed in claim 4 wherein said linkage means is pivotally connected at one end to said supporting rings and to the other end to said rotating structures.

* * * * *